United States Patent
Amir et al.

(10) Patent No.: US 6,393,136 B1
(45) Date of Patent: May 21, 2002

(54) METHOD AND APPARATUS FOR DETERMINING EYE CONTACT

(75) Inventors: Arnon Amir, Cupertino; Myron Dale Flickner, San Jose; David Bruce Koons, San Jose; Carlos Hitoshi Morimoto, San Jose; Shumin Zhai, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,476

(22) Filed: Jan. 4, 1999

(51) Int. Cl.$^7$ .................................................. G06K 9/00
(52) U.S. Cl. ...................... 382/103; 382/107; 382/173; 382/128; 382/116; 348/14; 348/169
(58) Field of Search ................................ 382/103, 166, 382/173, 118; 348/15, 169; 351/226, 210

(56) References Cited

U.S. PATENT DOCUMENTS

| | | | |
|---|---|---|---|
| 4,275,385 A | | 6/1981 | White .......................... 340/312 |
| 4,625,329 A | | 11/1986 | Ishikawa et al. ................ 382/1 |
| 4,931,865 A | | 6/1990 | Scarampi ..................... 358/84 |
| 4,950,069 A | * | 8/1990 | Hutchinson .................. 351/210 |
| 5,016,282 A | | 5/1991 | Tomono et al. ................. 382/2 |
| 5,220,361 A | * | 6/1993 | Lehmer et al. .............. 351/226 |
| 5,430,809 A | * | 7/1995 | Tomitaka ..................... 382/173 |
| 5,432,866 A | | 7/1995 | Sakamoto ..................... 382/128 |
| 5,500,671 A | * | 3/1996 | Anderson et al. .............. 348/15 |
| 5,550,928 A | | 8/1996 | Lu et al. ....................... 382/116 |
| 5,596,362 A | | 1/1997 | Zhou ............................ 348/14 |
| 5,861,940 A | * | 1/1999 | Robinson et al. ............ 351/221 |
| 5,995,639 A | * | 11/1999 | Kado et al. ................... 382/118 |
| 6,118,888 A | * | 9/2000 | Chino et al. ................. 382/118 |
| 6,122,400 A | * | 9/2000 | Reitmeier .................... 382/166 |

OTHER PUBLICATIONS

Ebisawa et al., "Effectiveness of Pupil Area Detection Technique Using Two Light Sources and Image Difference Method", *Proc. of the 15$^{th}$ Ann. Int'l Conf. of IEEE Engineering in Medicine and Biology Society*, vol. 15, (Jan. 1993), pp. 1268–1269.

Ebisawa, "Unconstained Pupil Detection Technique Using Two Light Sources and the Image Difference Method", Visualization and Intelligent Design in Engineering and Architecture (1995), pp. 79–89.

(List continued on next page.)

*Primary Examiner*—Leo Boudreau
*Assistant Examiner*—M B Choobin
(74) *Attorney, Agent, or Firm*—Dan Hubert & Assoc.

(57) ABSTRACT

A method and apparatus determine when a subject is looking at a specific target area by estimating a divergence angle between (1) the direction in which the subject is looking and (2) the direction from the subject directly to the target area. This technique accesses whether the subject is looking at a particular area. The invention may further condition this determination according to the subject's distance from the target area, because there is less tolerance for divergent angles when the subject is farther away. In one embodiment, the divergence angle is estimated using the position of a glint of light in the subject's pupil. The glint is created by a light source located in the target area. If the glint is sufficiently central to the pupil, with the camera and light source being near the target area, the subject is looking at the target area. At long distances, when the glint is not sufficiently discernable from the pupil, another technique may be employed to estimate divergence angle. Namely, the plane of the subject's face is computed, and analyzed with respect to a vector between the subject's face and the target area. If the plane is substantially normal to the vector, the subject is looking at the target area.

22 Claims, 3 Drawing Sheets

OTHER PUBLICATIONS

Fieguth et al., "Color–Based Tracking of Heads and Other Mobile Objects at Video Frame Rates", Proc. IEEE Conference on Computer Vision and Pattern Recognition (1997), pp. 21–27.

Govindaraju et al., "A Computational Model For Face Location," Proc. of the Int'l Conf. on Computer Vision (Dec. 1990), pp. 718–721, Osaka, Japan.

Harville et al., "Tracking People With Integrated Stereo, Color, and Face Detection,", Proc. of the IEEE Conference on Computer Vision and Pattern Recognition, Jun. 1998, pp. 601–608.

Kothari et al., "Detection of Eye Locations in Unconstrained Visual Images", Proc. Int'l Conf. on Image Processing (1996), Switzerland, pp. 519–522.

Poggio et al., "Example–Based Learning for View–Based Human Face Detection," MIT Al Lab TR–Al–1521 (1994), pp. 1–20.

Scassellati, "Eye Finding via Face Detection for a Foveated, Active Vision System," Proceedings of the $15^{th}$ Conf. on Artificial Intelligence (AAAI–98), ISBM 0–262–51098–7, Jul. 26–30, 1998.

Scassellati, "Real–Time Face and Eye Detection," world–wide–web, 1998.

Stiefelhagen et al., "A Model–Based Gaze Tracking System," Proc. Joint Symposium on Intelligence and Systems (1996), pp. 304–310.

Sirohey, "Human Face Segmentation and Identification", CAR–TR–695, CS–TR–3176, (1993 ), pp. 1–33.

Waibel et al., "A Real–Time Face Tracker", Proc. of the $3^{rd}$ IEEE Workshop on Applications of Computer Vision (1996), Sarasota, FL, pp. 142–147.

Aizawa et al., "Detection and Tracking of Facial Features," Proc. of the SPIE Com. and Image Proc. (1995), v. 2501, Taipei Taiwan, pp. 1161–1172.

Baluja et al., "Neural Network–Based Face Detection," Proc. IEEE Conf. on Computer Vision and Pattern Recognition (1996), San Francisco, CA, pp. 203–208.

Baluja et al., "Rotation Invariant Neutral Network–Based Face Detection," Proc. IEEE Conf. on Computer Vision and Pattern Recognition (Jun. 1998), Santa Barbara, CA, pp. 38–44.

Bérard et al., "LAFTER: Lips and Face Real Time Tracker," Proc. IEEE Conf. on Computer Vision and Pattern Recognition (Jun. 1997), Puerto Rico, pp. 123–129.

Birchfield, "Elliptical Head Tracking Using Intensity Gradients and Color Histograms," Proc. IEEE Conf. on Computer Vision and Pattern Recognition (1998), pp. 232–237.

Cohen et al., "Feature Extraction From Faces Using Deformable Template," International Journal of Computer Vision (1992), vol. 8, No. 2, pp. 99–111.

Darrell et al., "Active Face Tracking and Pose Estimation in an Interactive Room," MIT Media Lab, TR–356 (1996), pp. 1–16.

Darrell et al., "A Virtual Mirror Interface Using Real–Time Robust Face Tracking," Proc. Int'l conf. on Automatic Face and Gesture Recognition (Apr. 1998), Japan, pp. 616–621.

Darrell et al., "Integrated Person Tracking Using Stereo, Color, and Pattern Detection," Proc. IEEE Conf. on Computer Vision and Pattern Recognition (Jun. 1998), Santa Barbara, CA, pp. 601–608.

* cited by examiner

METHOD AND APPARATUS FOR DETERMINING EYE CONTACT

BACKGROUND OF THE INVENTION

1. Field of the Invention

The present invention relates to sophisticated interfaces between humans and machines. More particularly, the invention concerns a method and apparatus for determining when a subject has eye contact with a specific area.

2. Description of the Related Art

The phrase "user friendliness" refers to a machine's ease of use by a human being. For every machine, there may be some people that do not consider it user friendly, and therefore object to using it. As a notorious example, thousands of videocassette recorder (VCR) clocks across America idly blink the time of "12:00" because of the perceived difficulty of setting them. Clearly, increasing the power of the man-machine interface is an important step toward unlocking the potential of our machines.

Many existing tools enable humans to make their wishes known to machines. In simpler cases, there are levers, knobs, wheels, dials, pushbuttons, cranks, and the like. With more sophisticated machines, such as computers, there are mechanically operated input devices such as joysticks, mice, keyboards, digitizing pads, foot pedals, and the like. Moreover, engineers have developed even more complicated and powerful devices and techniques, such as voice control, eye gaze tracking, motion sensors, etc. Although these systems constitute a significant advance and enjoy widespread commercial success today, the engineers and scientists at International Business Machines Corp. (IBM) continually seek improvements in the performance and efficiency of human-machine interfaces.

SUMMARY OF THE INVENTION

Broadly, the present invention concerns a method and apparatus to determine when a subject has eye contact with a specific target area. In one embodiment, the invention accomplishes this by estimating an angle between (1) the direction in which the subject is looking and (2) the direction from the subject directly to the target area. This technique accesses whether the subject is looking in a particular direction.

In one embodiment, the angle is estimated using the position of a glint of light in the subject's pupil. A light source, which may be positioned within the target area to simplify computations, directs light toward the eye to create a glint upon the subject's cornea. A light sensor, positioned within the target area, then detects the glint and measures the glint position. The invention also generates or otherwise receives a machine-readable representation of the pupil. This representation may comprise, for instance, identification of certain pixels that represent the pupil in a camera image.

The glint position is then analyzed with respect to the pupil to determine whether their relative positions meet certain criteria. In one embodiment, this may involve determining whether the glint position is sufficiently central to the pupil. Accordingly, if the glint position is sufficiently central, and the light source and camera are positioned near the target area, the invention decides that the subject is looking at the target area.

According to another embodiment, the invention may use face orientation rather than glint position to determine whether the subject is looking in the target area. In this embodiment, the invention first generates or otherwise receives a machine-readable input representing the three-dimensional position of multiple points on the subject's face. As an example, these points may represent the tip of the nose, the nostrils, the corners of the mouth, and the subject's eyes. Using these points, the invention computes a face plane describing an average orientation of the face. A refined estimate can be obtained using the relative position of the eyes in their eye sockets.

Next, the orientation of the face plane is analyzed with respect to the target area. As an example, this may be performed by computing the dot product of the face plane and the vector between the face and the target area. Only if the face plane is sufficiently normal to this vector does the invention decide that the subject is looking at the target area.

A particularly useful aspect of the invention conditions eye contact estimations according to the subject's distance from the target area, because there is less tolerance for divergent angles when the subject is farther away. This conditioning helps to more accurately determine whether the subject is looking at a particular target object. Range between the subject and the target object may be further used to determine whether to use the glint-based embodiment or the face-plane-embodiment. The glint-based embodiment is better for closer ranges, whereas the face-plane embodiment is advantageous for farther ranges where glint may be imperceptible. Thus, the invention may be implemented to use the glint-based embodiment unless long range makes it difficult to distinguish glint from pupil, whereupon the face plane embodiment is employed.

The invention may be implemented in various embodiments. In one embodiment, the invention may be implemented to provide a method to determine when a subject is looking at a specific area. In another embodiment, the invention may be implemented to provide a logic circuit or a computer-driven apparatus for determining when a subject is looking at a specific area. In still another embodiment, the invention may be implemented to provide a signal-bearing medium tangibly embodying a program of machine-readable instructions executable by a digital data processing apparatus to perform operations for determining when a subject is looking at a specific area.

The invention affords its users with a number of distinct advantages. First, the invention facilitates more natural human-machine interaction by determining when a subject is looking at a designated area, such as the machine itself. The invention also helps avoid potential errors by using eye contact to determine the user's intent when issuing a potentially ambiguous command in an environment populated with multiple voice operated machines. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a method and apparatus for determining when a subject is looking at a specific area.

HARDWARE COMPONENTS & INTERCONNECTIONS

Introduction

One aspect of the invention concerns an eye contact sensing system, which may be embodied by various hardware components and interconnections. One example is the system 100, shown in FIG. 1. Generally, the function of the system 100 is to determine whether a subject 150 is looking at a target area. The subject may be human or otherwise, as long as it has a face including an eye. As explained below, this eye contact data is beneficial in constructing more natural, user-friendly human-machine interfaces. For example, if the target area corresponds to a particular household appliance, the system 100 can easily tell whether a voice command issued by the subject 150 is intended for that appliance or not.

Figure 1:
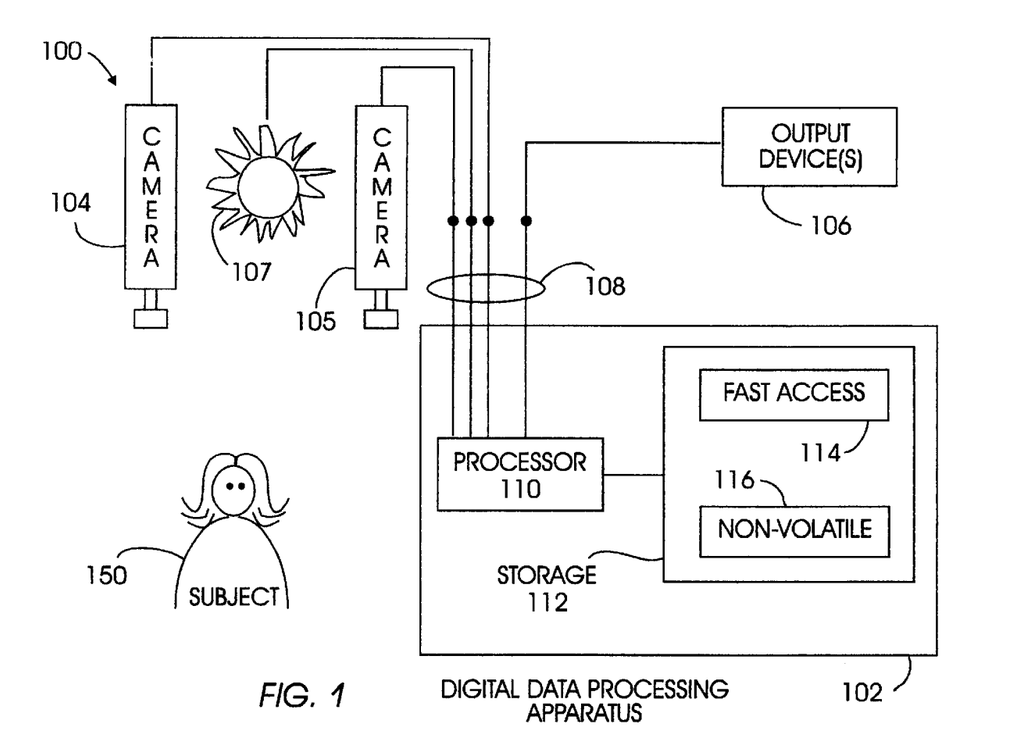
FIG. 1 is a block diagram of the hardware components and interconnections of a system for determining eye contact in accordance with the invention.

The system 100 includes a number of different components, providing one example of the invention. Ordinarily skilled artisans (having the benefit of this disclosure) will recognize that certain components may be substituted, eliminated, consolidated, or changed in various ways without affecting the invention's operation.

The system 100 includes a digital data processing apparatus 102 ("computer"), a first camera 104, a second camera 105, a light source 107, and one or more output devices 106.

Light Source

The light source 107 is used in a first embodiment ("eye glint embodiment") to create a glint in the subject's eyes, and in a second embodiment ("facial orientation embodiment") to illuminate the subject's facial features. As discussed below, the position of the glint relative to the subject's pupil provides information helpful in determining whether the subject is looking at a target area. The light source 107 may be provided by an incandescent light bulb, fluorescent light bulb, infrared light emitting device, candle, vessel of reacting chemicals, or another suitable source. Preferably, the light source 107 uses infrared light, so that the subject is not disturbed by the light. To conveniently cast light upon the subject 150, the light source emanates light upon a wide area (e.g., omnidirectionally) rather than a collimated beam such as a laser beam. The light source 107 may provide a single, distinctive glint, a predetermined concurrent glint pattern, or time-coded glint patterns. To help in creating a recognizable glint, the light source 107 may provide polarized light, a prescribed wavelength of light, etc.

As discussed below, the light source 107 may be omitted in an alternative embodiment. In this embodiment, the subject's face position is used to determine eye contact. Accordingly, ambient natural light (or room light) may be sufficient to illuminate the subject's face to estimate face orientation.

Cameras

The cameras 104–105 comprise devices capable of representing the appearance of a scene in machine-readable format. To suit this purpose, the cameras 104–105 may comprise black/white video cameras, color video cameras, camcorders, etc. The cameras 104–105 may be sensitive to some or all of the visible spectrum of light, infrared light, another wavelength of light, or any other wavelength of emitted energy including at least the energy emitted by the light source 107. In an exemplary embodiment, where the light source 107 is an incandescent light, the cameras 104–105 comprise black/white video cameras.

In the illustrated embodiment, the camera 104 has a wider field of view, and the camera 105 has a narrower field of view. The wide-angle camera 104 is used to locate the subject, whereas the narrow-angle camera 105 is used to monitor more detailed features of the eye. The cameras 104–105 may also be used cooperatively to determine the distance to the subject 150. Alternatively, a single high resolution camera can be used to find the subject and monitor the details of the eye.

In the eye glint embodiment, the narrow-angle camera 105 may be placed near the light source 107. As an example, this camera 105 and the light source 107 may be configured to share the same optical axis (e.g., by the use of splitting mirrors, etc.) in order to simplify glint evaluating calculations. By placing the camera 105 and light source 107 on the same optical axis, the glint in the subject's eyes is central to the subject's pupils if the subject is looking at the camera 105. Glint evaluating calculations may be further simplified by placing the camera 105 and light source 107 near the target area.

Output Device(s)

The output devices(s) 106 include one or more devices that receive the results of the present invention's eye contact sensing operation. For ease of illustration, only one output device is described, although there may be multiple output devices. In one embodiment, the output device 106 may comprise a mechanism informing a human user whether there is eye contact, such as a video monitor, sound speaker, LCD display, light emitting diode, etc.

Another embodiment of output device is a machine whose operation uses eye contact as an input. Some examples include (1) a voice operated VCR that does not respond to voice commands unless the subject is looking at the VCR, and (2) a computer that activates or deactivates certain functions depending upon whether the subject is looking at the computer.

Digital Data Processing Apparatus

The computer 102 receives input from the cameras 104–105 and performs computations to determine whether the user is looking at a defined target area. This target area may be predefined by programming the computer 102, set by user input, etc. The target area is defined by a particular region, as discussed in greater detail below. For example, if the output device 106 is a voice operated VCR, the target area may be defined to include the VCR itself.

The computer 102 may be embodied by various hardware components and interconnections. As shown, the computer 102 includes a processor 110, such as a microprocessor or other processing machine, coupled to a storage 112. In the present example, the storage 112 includes a fast-access storage 114, as well as nonvolatile storage 116. As an example, the fast-access storage 114 may comprise random access memory (RAM), and may be used to store the programming instructions executed by the processor 110. The nonvolatile storage 116 may comprise, for example, one or more magnetic data storage disks such as a "hard drive," a tape drive, or any other suitable storage device. The computer 102 also includes an input/output 108, such as a number of lines, buses, cables, electromagnetic links, or other means for the processor 110 to exchange data with the hardware external to the computer 102, such as the light source 107, cameras 104–105, and output device 106.

Despite the specific foregoing description, ordinarily skilled artisans (having the benefit of this disclosure) will recognize that the apparatus discussed above may be implemented in a machine of different construction, without departing from the scope of the invention. As a specific example, one of the components 114, 116 may be eliminated; furthermore, the storage 112 may be provided on-board the processor 110, or even provided externally to the apparatus 102.

OPERATION

In addition to the various hardware embodiments described above, a different aspect of the invention concerns a method for sensing when a subject is looking at a specific area. This method may be implemented, for example, using the hardware environment discussed above.

Signal-Bearing Media

In the context of FIG. 1, such a method may be implemented, for example, by operating the digital data processing computer 102 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to sense when a subject is looking in a specific direction.

Figure 2:
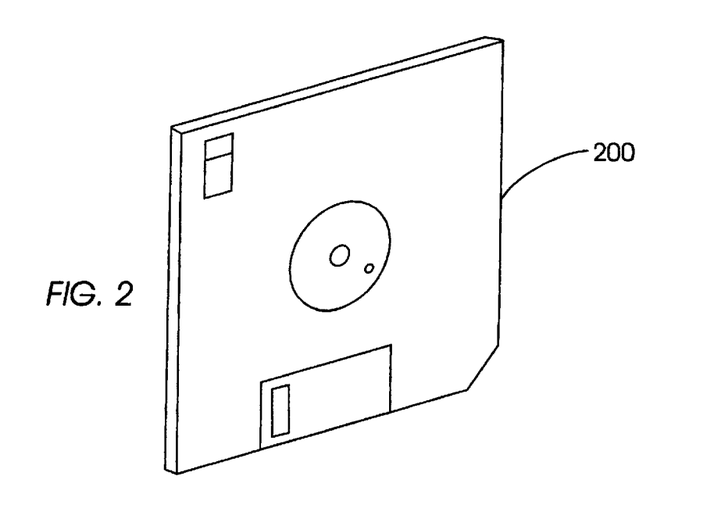
FIG. 2 shows an exemplary signal-bearing medium in accordance with the invention.

This signal-bearing media may comprise, for example, RAM (not shown) contained within the storage 112, as represented by the fast-access storage 114 for example. Alternatively, the instructions may be contained in another signal-bearing media, such as a magnetic data storage diskette 200 (FIG. 2), directly or indirectly accessible by the processor 110. Whether contained in the storage 112, diskette 200, or elsewhere, the instructions may be stored on a variety of machine-readable data storage media, such as direct access storage (e.g., a conventional "hard drive," redundant array of inexpensive disks (RAID), or another direct access storage device (DASD)), magnetic tape, electronic read-only memory (e.g., ROM, EPROM, or EEPROM), optical storage (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In addition to the signal-bearing media discussed above, the present invention's method for determining eye contact may be implemented in a different way, without using a processor to execute instructions. Namely, the method may be achieved by using logic circuitry instead of executing stored programming instructions with a digital data processor. Depending upon the particular requirements of the application in the areas of speed, expense, tooling costs, and the like, this logic may be implemented by constructing an application specific integrated circuit (ASIC) having thousands of tiny integrated transistors. Such an ASIC may be implemented using CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), and the like.

Sensing Eye Contact Using Glint (Eye Glint Embodiment)

Figure 3:
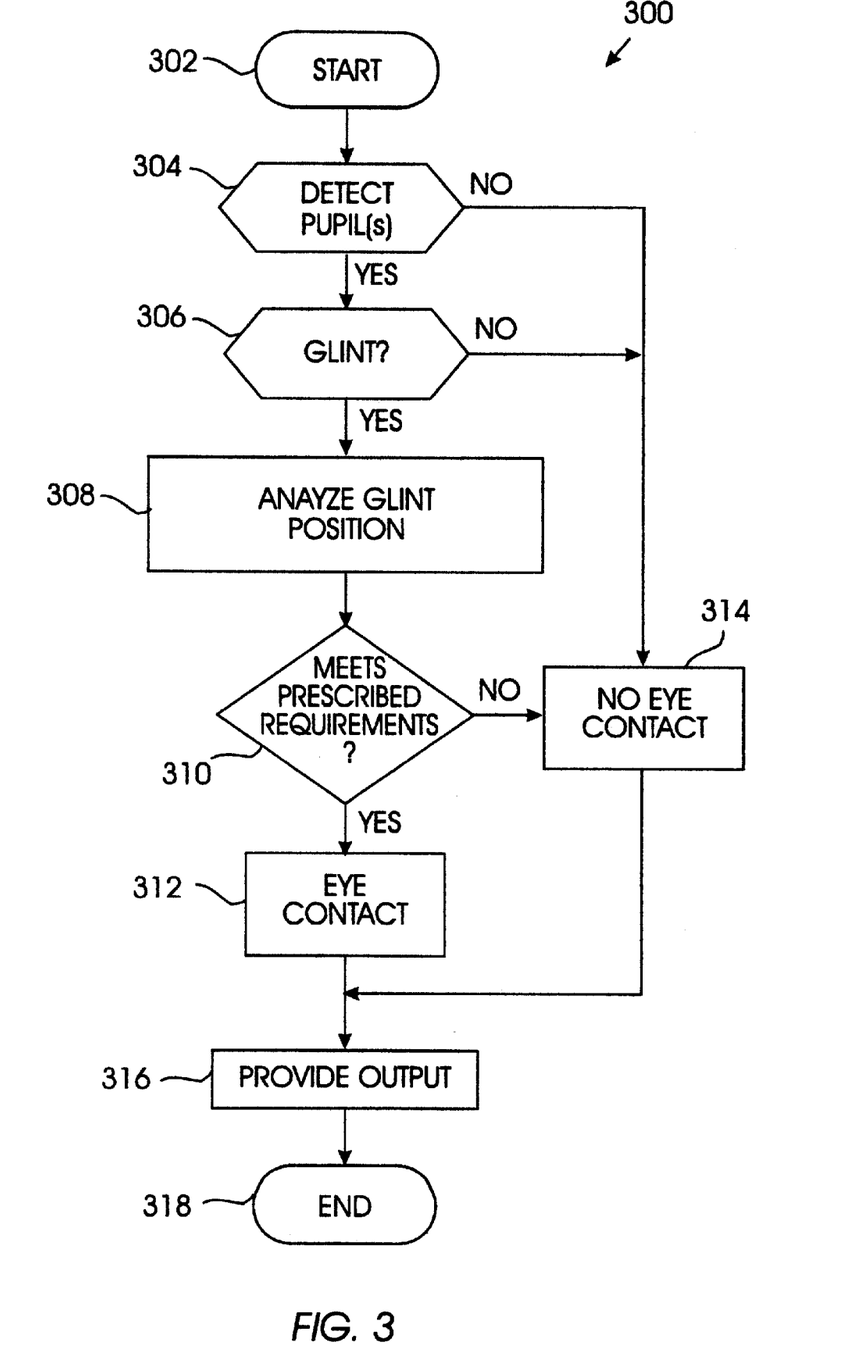
FIG. 3 is a flowchart depicting a sequence of operations for determining eye contact using gaze, according to one embodiment of the invention.

FIG. 3 shows a sequence 300 to illustrate one example of an operating sequence for sensing eye contact. For ease of explanation, but without any intended limitation, the example of FIG. 3 is described in the context of the system 100 (FIG. 1) described above. The sequence 300 starts in step 302. First, step 304 detects one or more pupils of the subject 150. This is performed by using the wide-angle camera 104 to produce an image of the subject 150, and operating the computer 102 to analyze the image. This analysis identifies the pupils by distinguishing them from other features in the image. Ultimately, step 304 precisely determines the locations of the pupils in the camera image. This operation may be performed by various techniques, such as known filtering processes. Another example of a suitable approach for step 304 discussed in U.S. Pat. No. 5,016,282 to Tomono et al., issued on May 14, 1991 and hereby incorporated by reference in its entirety. As still another example, step 304 may also be performed using the techniques described in U.S. patent application Ser. No. 09/238,979, entitled "Method and Apparatus for Associating Pupils With Subjects," filed on Jan. 27, 1999 in the names of Arnon Amir et al., and assigned to IBM.

If step 304 does not find any pupils, the computer 102 concludes that there is no eye contact (step 314), provides a representative output (step 316) to the output device 106, and ends the sequence (step 318).

If one or more pupils are detected, step 304 proceeds to step 306, which determines whether there is a glint. The glint is produced by the cornea of the eye reflecting light from the source 107. More specifically, step 306 is performed by the computer 102 analyzing an image from the narrow-view camera 105 to determine whether the pupils (found in step 304) exhibit a glint. Alternatively, both steps 304/306 may use the same camera, if enough resolution is available. The features needed to constitute a "glint" may be user specified, or they may be preprogramed into the computer 102. These features include the brightness of glint region relative to surrounding pupil, minimum size of glint region, etc. As an example, step 306 may require a brightness higher than a certain percentage of the brightest detected point anywhere in the image, the brightest point in the vicinity of the eye, etc. Other alternatives include creating a particularly recognizable glint by using a pattern source light, time-coded light source, distinct wavelength of light source, polarized light source, etc.

If no glint is detected in step 306, the computer 102 concludes that there is no eye contact (step 314), provides a representative output to the device 106 (step 316), and ends the sequence 300 (step 318). In contrast, if glint is detected, step 306 advances to step 308, where the computer 102 analyzes the relative position of the glint and the pupil. As one example, this may be done by analyzing the camera image to compute the respective centers of the glint and pupil, and then computing a relative measure of their difference. This relative difference may be a number of pixels of the camera image, a percentage of the pupil size, the angle between rays projecting from the eye center through respective centers of the glint and the pupil, absolute distance, etc.

After step 308, step 310 determines whether the relative position of the glint with respect to the pupil meets certain predetermined requirements (step 310). If so, there is eye contact (step 312) with a target area. Otherwise, there is no eye contact (step 314) with the target area. The requirements of step 310 are established in accordance with the desired target area, such that meeting these requirements guarantees eye contact with the desired target area. The target area may comprise one or more regions in space, having a desired shape and size; with the use of both cameras 104–105 or other distance sensing equipment, a target area with specified range from the subject may also be established. The target area, for example, may be selected to correspond to an appliance such as a VCR or computer.

In one embodiment, the requirements of step 310 may specify a minimum level of closeness between the glint and the pupil center, which may be evaluated using a user-specified or preprogramed threshold. Depending upon the technique used to measure relative difference, this threshold may be a number of pixels (depending on image resolution, focal length of camera lens, etc.), a percentage of pupils size (e.g., ten %),an angle, or an absolute distance (e.g., 1–2 millimeters). Alternatively, instead of using closeness to pupil center, step 310 may analyze whether the glint resides in an area of prescribed shape and size that includes the pupil, for example, an ellipse, a crescent, another shape, or an offset of such a shape from pupil center to accommodate the offset of the fovea from eye's optical axis. Such shapes may also be designed to accommodate misalignment of the camera 105 and/or light source 107 from the target area, etc.

The invention also contemplates various alternatives to the foregoing description where glint position is analyzed relative to pupil center or a region of prescribed shape and size. For instance, glint position may be analyzed using empirical data. In this embodiment, the processor 110 may be trained to recognize eye contact by presenting the system 100 with a series of positive and negative eye contact training examples, and instructing the processor 110 as to which examples are positive and which negative.

After steps 312 or 314, the computer 102 provides an output indicating whether there is eye contact or not (step 316). In the illustrated example, the computer 102 provides this output to the output device 106. Following step 316, the routine 300 ends in step 318.

Estimating Eye Contact Using Face Orientation (Face Orientation Embodiment)

Figure 4:
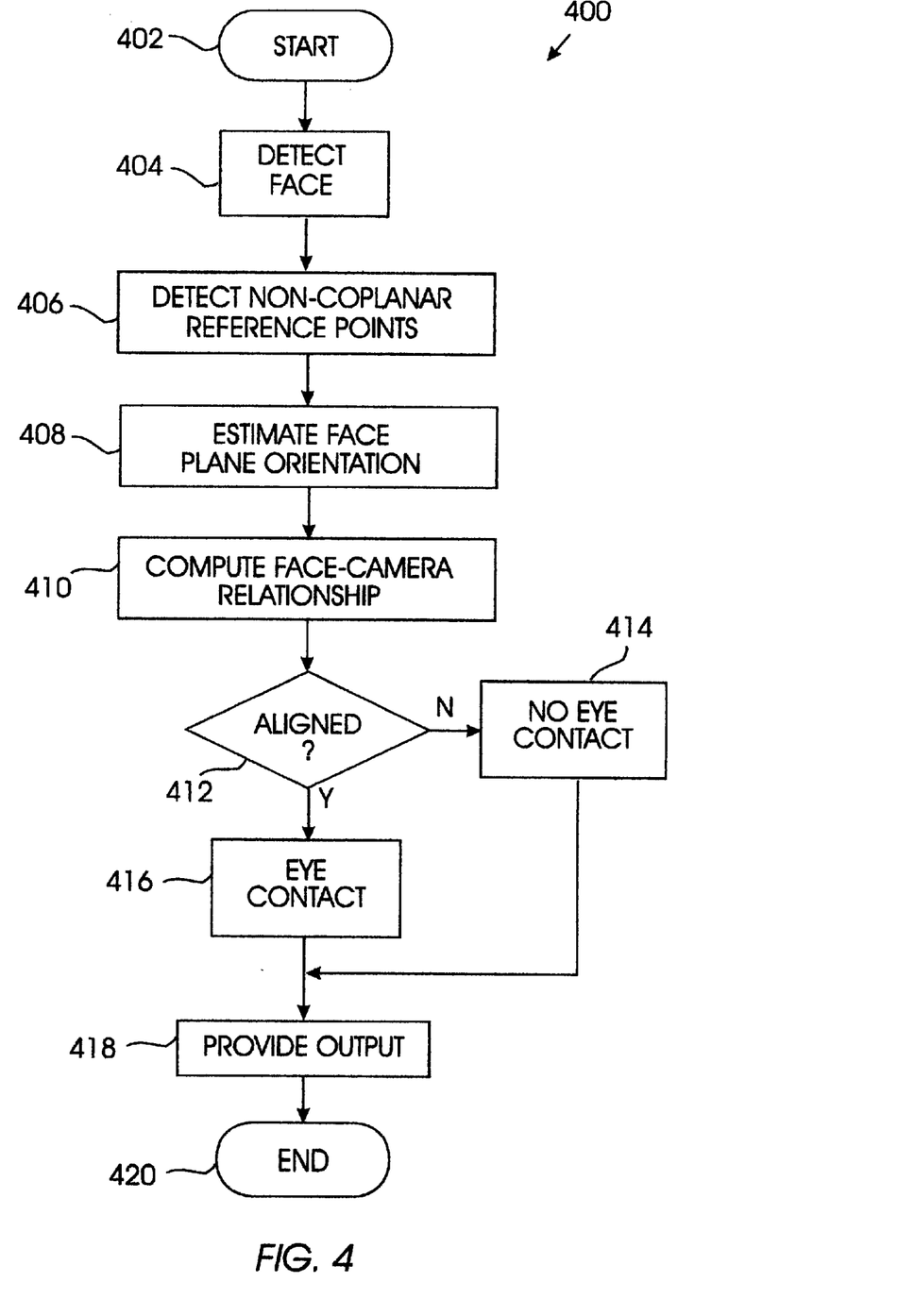
FIG. 4 is a flowchart depicting a sequence of operations for determining eye contact using face position, according to one embodiment of the invention.

FIG. 4 shows a sequence 400 to illustrate another example of an operating sequence for sensing eye contact. For ease of explanation, but without any intended limitation, the example of FIG. 4 is described in the context of the system 100 (FIG. 1) described above. Instead of using glint to sense eye contact as in FIG. 3, the sequence 400 analyzes the subject's face orientation to determine eye contact. The sequence 400 is initiated in step 402.

After step 402, the computer 102 uses images from the wide-angle camera 104 to detect the subject's face (step 404). Detection of the face may use various techniques, some of which are familiar to ordinarily skilled artisans. For example, face detection may use a combination of attributes such as color, shape, motion, and depth. The template matching scheme is one example of this approach, as described in U.S. Pat. No. 5,550,928 to Lu et al., issued on Aug. 27, 1996. Skin color analysis is another example, as described in U.S. Pat. No. 5,430,809 to Tomitaka, issued on Jul. 4, 1995. Another approach is the "Interval" system. The Interval system obtains range information using a sophisticated stereo camera system, gathers color information to evaluate as flesh tones, and analyzes face candidate inputs with a neural network trained to find faces. An example of the Interval system is described in Darrell et al., "Tracking People With Integrated Stereo, Color, and Face Detection," Perceptual User Interface Workshop, 1997.

In the context of step 404, still further useful approaches are shown by the following references: (1) T. Darrell et al., "Integrated person Tracking Using Stereo, Color, and Pattern Detection," 1998, and (2) T. Darrell et al, "Active Face Tracking and Pose Estimation in an Interactive Room," CVPR 1996.

As a different approach for step 404, user detection may be achieved using pupil detection. Pupil characteristics may be further analyzed to track eye position and movement, as described in U.S. Pat. No. 5,016,282, issued on May 14, 1991 to Tomono et al. Another approach that is beneficial for detecting faces is provided by U.S. application Ser. No. 09/238,979, entitled "Method and Apparatus For Associating Pupils With Subjects," filed herewith in the names of the present inventors and assigned to IBM.

Using the image from the same camera 104 (or the narrow-angle camera 105), the computer 102 then proceeds to identify several non-coplanar facial features (step 406). This may involve using intra-ocular distance to estimate head size and distance from the camera, and to locate other facial features such as eyebrows, nostrils, and mouth.

Next, in step 408, the computer 102 estimates the orientation of the subject's facial plane. The facial plane orientation is the subject's "head pose." Steps 404–408 may be performed by various techniques known to ordinarily skilled artisans. Some exemplary techniques are described in Yang & Waibel, "Real-Time Face Tracker," and Stiefelhagen et al., "A Model-Based Gage Tracking System," 1996. Further refinement may be obtained by analyzing the position of the subject's iris relative to the head.

After step 408, the computer 102 determines the relationship between the subject's facial plane orientation and a specified target area (step 410). This target area may be user-specified or pre-programmed into the computer 102. The object of the sequence 400 is to determine whether the subject is looking at this target area. Thus, the target area may be some or all of specific object, an arbitrary region, imaginary region between two planes intersecting at the face, or any other field. In the present example, the target area corresponds to the camera 104, and sequence 400 thus determines whether the subject is looking at the camera 104.

Step 410 is performed by the computer 102 calculating the dot product of (1) a vector normal to the subject's facial plane and (2) a vector between the target area and the subject's face. To ease computations, the camera 105 may be placed near the target area. Based upon this calculation, the computer 102 then determines whether the subject's face is sufficiently aligned with the target area (step 412). Alignment may be evaluated, for example, using a user-specified or preprogramed threshold. If the calculated dot product exceeds the threshold, there is eye contact (step 416). If the calculated dot product is less than the threshold, there is no eye contact (step 414).

After steps 414 or 416, the computer 102 provides an output indicating whether there is eye contact or not (step 418). In the illustrated example, the computer 102 provides this output to the output device 106. Following step 418, the routine 400 ends in step 420.

Supplementing Preliminary Eye Contact Data With Range

As an enhancement to the foregoing techniques, "range" (distance) between the subject 150 and the cameras may be used to condition a conclusion of eye contact (or no eye contact). In the eye glint embodiment, for instance, less eye glint displacement from pupil center is tolerable when the subject 150 is farther away from the camera 105. Similarly, with more distant subjects in the facial orientation embodiment, the facial plane must be more nearly normal to the vector between the subject's eye and the camera 105.

Supplementing Eye Contact Data With Temporal Analysis

As another enhancement to the foregoing technique, the history of the measured pupil, glint position, face orientation, and other measurements may be considered in order to provide a more robust and stable eye contact decision. The eye contact evaluation process is very fast, e.g., on the order of thirty frames per second with an NTSC camera. It is much faster than the human fixation process, which lasts about 200–400 milliseconds. Therefore a sequence of camera images (frames) may be analyzed more quickly than an eye contact event ("fixation" or "glance").

In this embodiment, the eye contact decision of step 310 may be conditioned by requiring the eye contact (that satisfies the requirements of step 310) to last for a prescribed time period. As an example, if the subject's face orientation is continuously changing, but happened to align with the camera for less than 100 milliseconds, then it would not be accepted as eye contact. This technique may be implemented using timebased eye contact thresholds, statistical models, a trained neural network, a state machine, etc.

Using Glint Position and Face Orientation Together

The analysis of glint position and face orientation may be combined to provide a more comprehensive eye contact sensing system. For example, glint position may be used when the subject is nearer to the camera 105, and face plane orientation used when the subject is more distant from the camera 105. In one embodiment, the cameras 104–105 are first used together to measure distance to the subject 150, and then either the glint position or face plane orientation technique is invoked accordingly.

In another embodiment, the glint position may always be initially used to sense eye contact. If glint position is not sufficiently discernable due to the subject's range, then the face plane orientation technique is used as a backup procedure. The discernability of glint position may be improved by using a high resolution zoom lens, or other suitable magnification techniques.

Using Eye Contact Output

The output of eye contact (or no eye contact) from step 316 (FIG. 3) or step 418 (FIG. 4) may be used in many different ways. As one example, this output may be used to resolve any ambiguity in voice-issued commands when more than one voice operated machine is present. In this embodiment, the cameras 104–105 and light source 107 are associated with a particular voice operated machine, and may even be positioned in a collinear fashion with the voice operated machine and the subject to simplify eye contact computations. When the subject issues a voice command while maintaining eye contact with one/both cameras 104–105, the system 100 may provide a representative output (steps 316 or 418) to all voice operated machines. Each such machine may be configured to respond to a voice command only if the output of the system 100 shows eye contact with that particular machine. In a specific example of this arrangement, when a VCR and audio tape deck are both enabled, and the subject says "PLAY," this apparent ambiguity is arbitrated using eye contact.

In another embodiment, the system 100 may serve multiple voice operated machines, without requiring any particular alignment or position of system component with respect to the voice operated machines. Due to the offset between system components and the subject, this embodiment requires some additional trigonometric computation to accurately sense eye contact, as will be apparent to ordinarily skilled artisans having the benefit of this disclosure.

As another example, the output (steps 316 or 418) may be provided to a computer, television, VCR, or other appliance for use in operating a screen saver or other power saving feature. Here, the computer can selectively activate its components when the subject is looking at the computer, or deactivate components when the subject looks away for several minutes.

In conclusion, eye contact sensing is extremely helpful in making the human-machine interface more human-like and less machine-like. Thus, the interface becomes more natural, and less governed by the mechanical requirements of the machine. This alleviates user stress, and helps the user actually enjoy using the machine.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for determining whether a subject is looking at a target area, the subject having a face including an eye with a pupil, the method comprising the operations of:
   if distance between the subject and the target area is less than a predetermined range, performing operations comprising:
      operating a light source to create a glint upon the subject's eye;
      using a light sensor to detect the glint and measure glint position;
      receiving a machine-readable representation of the pupil;
      analyzing relative position of the glint with respect to the pupil to determine whether the relative position satisfies predetermined criteria; and
      only if the relative position satisfies the predetermined criteria, providing an eye contact output declaring that the subject is looking at the target area;
   otherwise, if distance between the subject and the target area is less than the predetermined range, performing operations comprising:
      receiving a machine-readable input representing three-dimensional positions of multiple points on the face;
      using the points to compute a face plane describing an average orientation of the face;
      determining alignment between the face plane and the target area; and
   if the alignment between the face plane and the target area meets predetermined criteria, providing an eye contact output declaring that the subject is looking at the target area.

2. The method of claim 1, further comprising the operations of estimating the distance between the target area and the subject.

3. The method of claim 1, the operations further comprising deeming the distance between the target area and the subject to be less than a predetermined threshold whenever the glint and pupil are sufficiently distinguishable.

4. A method for conditionally processing voice input, comprising:
   operating a light source to create a glint upon the subject's eye;
   using a light sensor to detect the glint and measure glint position;
   receiving a machine-readable representation of the pupil;
   analyzing relative position of the glint with respect to the pupil to determine whether the relative position satisfies predetermined criteria;
   only if the relative position satisfies the predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

5. A method for conditionally processing voice input comprising:

receiving a machine-readable input representing three-dimensional position of multiple points on the face;

using the points to compute a face plane describing an average orientation of the face;

determining alignment between the face plane and the target area;

if the alignment between the face plane and the target area meets predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

6. A signal-bearing medium tangibly embodying a program of machine-readable instructions executable by a digital data processing apparatus to perform operations for determining whether a subject is looking at a target area, the subject having a face including an eye with a pupil, the operations comprising:

if distance between the subject and the target area is less than a predetermined range, performing operations comprising:

operating a light source to create a glint upon the subject's eye;

using a light sensor to detect the glint and measure glint position;

receiving a machine-readable representation of the pupil;

analyzing relative position of the glint with respect to the pupil to determine whether the relative position satisfies predetermined criteria; and only if the relative position satisfies the predetermined criteria, providing an eye contact output declaring that the subject is looking at the target area;

otherwise, if distance between the subject and the target area is less than the predetermined range, performing operations comprising:

receiving a machine-readable input representing three-dimensional positions of multiple points on the face;

using the points to compute a face plane describing an average orientation of the face;

determining alignment between the face plane and the target area; and if the alignment between the face plane and the target area meets predetermined criteria, providing an eye contact output declaring that the subject is looking at the target area.

7. The medium of claim 6, the operations further comprising estimating the distance between the target area and the subject.

8. The medium of claim 6, the operations further comprising deeming the distance between the target area and the subject to be less than a predetermined threshold whenever the glint and pupil are sufficiently distinguishable.

9. A signal-bearing medium tangibly embodying a program of machine-readable instructions executable by a digital data processing apparatus to perform operations for conditionally processing voice input according to whether a subject having a face is looking at a target area, the operations comprising:

operating a light source to create a glint upon the subject's eye;

using a light sensor to detect the glint and measure glint position;

receiving a machine-readable representation of the pupil;

analyzing relative position of the glint with respect to the pupil to determine whether the relative position satisfies predetermined criteria;

only if the relative position satisfies the predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

10. A signal-bearing medium tangibly embodying a program of machine-readable instructions executable by a digital data processing apparatus to perform operations for conditionally processing voice input according to whether a subject having a face is looking at a target area, the operations comprising:

receiving a machine-readable input representing three-dimensional position of multiple points on the face;

using the points to compute a face plane describing an average orientation of the face;

determining alignment between the face plane and the target area;

if the alignment between the face plane and the target area meets predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

11. A logic circuit configured to perform operations for determining whether a subject is looking at a target area, the subject having a face including an eye with a pupil, the operations comprising:

if distance between the subject and the target area is less than a predetermined range, performing operations comprising:

operating a light source to create a glint upon the subject's eye;

using a light sensor to detect the glint and measure glint position;

receiving a machine-readable representation of the pupil;

analyzing relative position of the glint with respect to the pupil to determine whether the relative position satisfies predetermined criteria; and only if the relative position satisfies the predetermined criteria, providing an eye contact output declaring that the subject is looking at the target area;

otherwise, if distance between the subject and the target area is less than the predetermined range, performing operations comprising:

receiving a machine-readable input representing three-dimensional position of multiple points on the face;

using the points to compute a face plane describing an average orientation of the face;

determining alignment between the face plane and the target area; and if the alignment between the face plane and the target area meets predetermined criteria, providing an eye contact output declaring that the subject is looking at the target area.

12. A logic circuit configured to perform operations for conditionally processing voice input according to whether a subject having a face is looking at a target area, the operations comprising:

operating a light source to create a glint upon the subject's eye;

using a light sensor to detect the glint and measure glint position;

receiving a machine-readable representation of the pupil;

analyzing relative position of the glint with respect to the pupil to determine whether the relative position satisfies predetermined criteria;

only if the relative position satisfies the predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

13. A logic circuit configured to perform operations for conditionally processing voice input according to whether a subject having a face is looking at a target area, the operations comprising:

receiving a machine-readable input representing three-dimensional position of multiple points on the face;

using the points to compute a face plane describing an average orientation of the face;

determining alignment between the face plane and the target area;

if the alignment between the face plane and the target area meets predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

14. A computer-driven eye contact sensing system, comprising:

a light source;

a light sensor; and an eye contact estimating apparatus, coupled to the light sensor and configured to perform operations for determining whether a subject is looking at a target area, the subject having a face including an eye with a pupil, the operations comprising:

if distance between the subject and the target area is less than a predetermined range, performing operations comprising:

operating a light source to create a glint upon the subject's eye;

using a light sensor to detect the glint and measure glint position;

receiving a machine-readable representation of the pupil;

analyzing relative position of the glint with respect to the pupil to determine whether the relative position satisfies predetermined criteria; and only if the relative position satisfies the predetermined criteria, providing an eye contact output declaring that the subject is looking at the target area;

otherwise, if distance between the subject and the target area is less than the predetermined range, performing operations comprising:

receiving a machine-readable input representing three-dimensional positions of multiple points on the face;

using the points to compute a face plane describing an average orientation of the face;

determining alignment between the face plane and the target area; and if the alignment between the face plane and the target area meets, predetermined criteria, providing an eye contact output declaring that the subject is looking at the target area.

15. A computer-driven eye contact sensing system, comprising:

a light source;

a light sensor; and a data processing apparatus, coupled to the light sensor and programmed to conditionally process voice input according to whether a subject having a face is looking at a target area by performing operations comprising:

operating a light source to create a glint upon the subject's eye;

using a light sensor to detect the glint and measure glint position;

receiving a machine-readable representation of the pupil;

analyzing relative position of the glint with respect to the pupil to determine whether the relative position satisfies predetermined criteria;

only if the relative position satisfies the predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

16. The system of claim 15, the data processing apparatus comprising a digital data processing computer.

17. The system of claim 15, the data processing apparatus comprising a logic circuit.

18. The system of claim 15, the light sensor comprising a camera.

19. A computer-driven eye contact sensing system, comprising:

a light source;

a light sensor; and a data processing apparatus, coupled to the light sensor and programmed to conditionally process voice input according to whether a subject having a face is looking at a target area by performing operations comprising:

receiving a machine-readable input representing three-dimensional position of multiple points on the face;

using the points to compute a face plane describing an average orientation of the face;

determining alignment between the face plane and the target area; and if the alignment between the face plane and the target area meets predetermined criteria, providing an eye contact output declaring that the subject is looking at the target area;

responsive to issuance of voice input, consulting the eye contact output to determine whether the subject is looking in the target area; and ignoring the voice input unless the subject is looking in the target area when issuing the voice input.

20. The system of claim 19, the data processing apparatus comprising a digital data processing computer.

21. The system of claim 19, the data processing apparatus comprising a logic circuit.

22. The system of claim 19, the light sensor comprising a camera.

* * * * *